United States Patent

[11] 3,566,803

| [72] | Inventors | Donald J. Blunden<br>Southfield;<br>Israel D. Peisner, Huntington Woods, Mich. |
|---|---|---|
| [21] | Appl. No. | 742,681 |
| [22] | Filed | July 5, 1968 |
| [45] | Patented | Mar. 2, 1971 |
| [73] | Assignee | Whitehead & Kales Company<br>River Rouge, Mich. |

[54] VEHICLE TIE-DOWN STRUCTURE
9 Claims, 5 Drawing Figs.

[52] U.S. Cl. .................................................. 105/369, 105/368

[51] Int. Cl. .................................................. B60p 7/10, B61d 45/00

[50] Field of Search .................................................. 105/368, 368 (T), 369 (A); 280/179, 179.1; 296/1 (A); 248/119, 361, 361 (A); 292/(Inquired), 266

[56] References Cited
UNITED STATES PATENTS

| 479,152 | 7/1892 | McClellan | 105/369(AUX) |
|---|---|---|---|
| 1,064,313 | 6/1913 | Garlock | 105/369(AUX) |
| 1,634,350 | 7/1927 | Briggs | 105/369(AUX) |
| 2,879,722 | 3/1959 | Dunlap | 105/369(B) |
| 3,120,375 | 2/1964 | Haynes | 105/368(TX) |
| 3,181,886 | 5/1965 | Blunden et al. | 280/179 |

*Primary Examiner*—Drayton E. Hoffman
*Attorney*—Whittemore, Hulbert and Belknap

ABSTRACT: This invention relates to a tie-down system for vehicles.

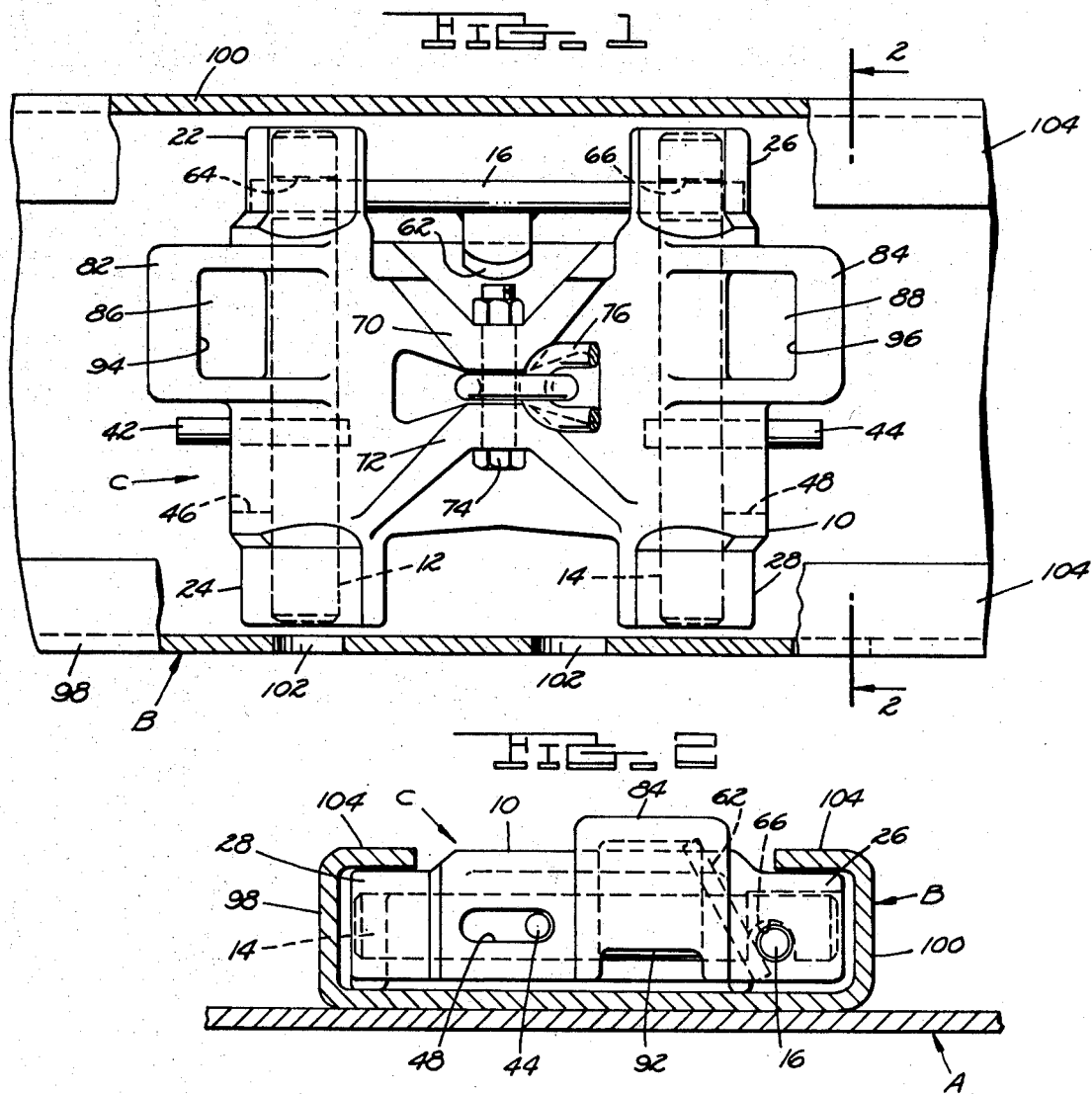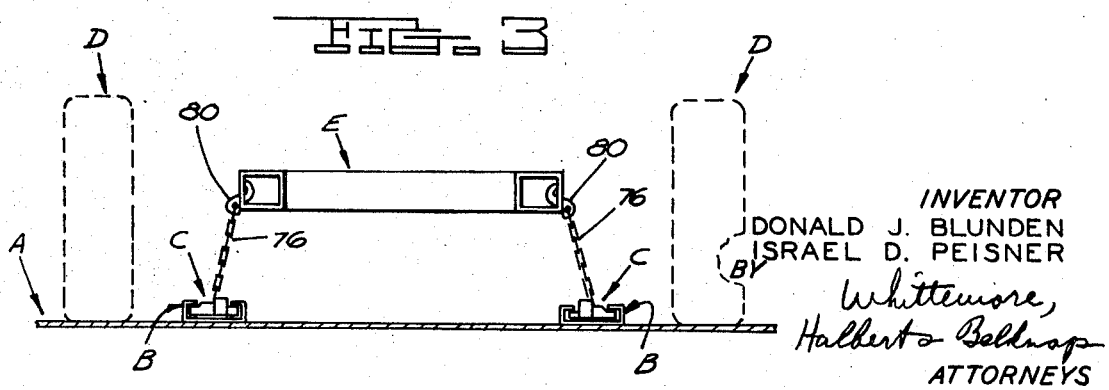

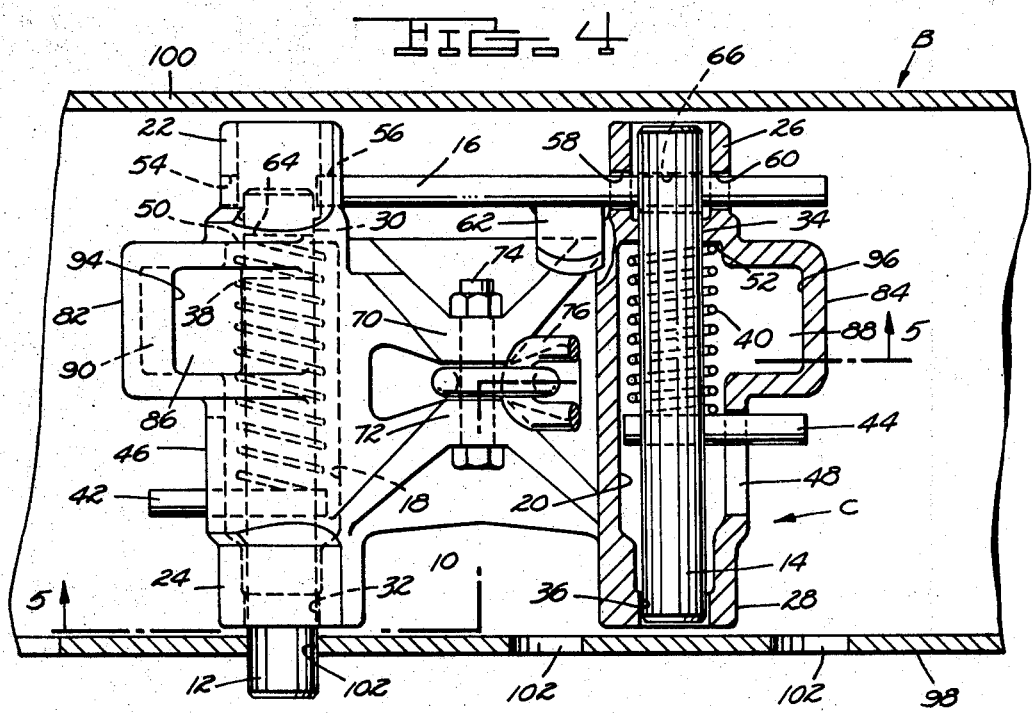
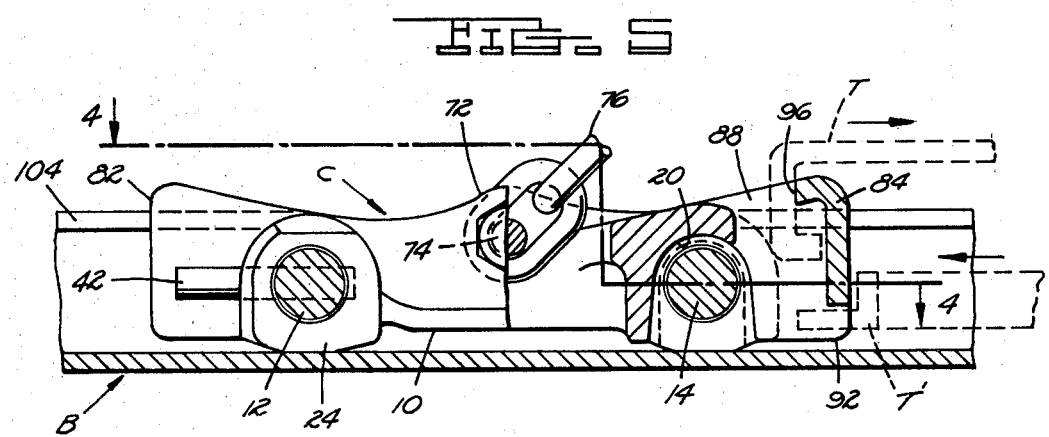

VEHICLE TIE-DOWN STRUCTURE

In the specific embodiment disclosed, a plurality of carriages are carried by and movable lengthwise of a rail or rails on the deck of a transport. Each carriage has a flexible element engageable with a vehicle to be tied down, and also one and preferably two lock pins independently movable to an extended position projecting through a selected opening in an upright side wall of the rail. Spring means urge the lock pins toward their extended positions and releasable detent means hold the lock pins retracted.

SUMMARY OF THE INVENTION

It is a primary object of the invention to provide an improved, more efficient tiedown structure for vehicles which is fast and easy to operate.

Another object of the invention is to provide a tiedown structure which eliminates the customary ratchet for tensioning the chain.

Another object of the invention is to provide a tiedown structure which is designed for tying down vehicles having extremely low clearance.

Another object of the invention is to provide a tiedown structure including a carriage having a pair of lock pins one or the other of which may be employed to engage a selected opening in a series of openings provided in the upright sidewall of the rail to lock the carriage in adjusted position.

Another object of the invention is to provide a tiedown structure in which the spacing between the lock pins is different than that between the openings in the upright sidewall to permit a closer adjustment in the location of the carriage along the length of the rail.

Another object of the invention is to provide detent means for holding either one or both of the lock pins in retracted position.

Another object is to provide detent means which is operative to release only one of the lock pins at a time.

Another object is to provide detent means which is incapable of blocking the retraction of an extended lock pin.

Other objects and features of the invention will become apparent as the description proceeds, especially when taken in conjunction with the accompanying drawings, wherein:

FIG. 1 is a fragmentary top plan view with parts broken away and in section showing a carriage of our invention in one of the longitudinally extending rails anchored to a deck of a transport;

FIG. 2 is a sectional view taken on the line 2—2 of FIG. 1;

FIG. 3 is a semidiagrammatic view taken transversely of the deck of the transport and showing portions of a vehicle tied down upon the deck;

FIG. 4 is a sectional view taken on the line 4—4 of FIG. 5; and

FIG. 5 is a sectional view taken on the line 5—5 of FIG. 4.

Referring now more particularly to the drawings, A is a longitudinally extending elongated substantially flat deck of a transport, such for example, as a railroad flatcar, the deck extending toward the viewer in FIG. 3, B are stationary main supporting channels or rails disposed in laterally spaced substantially parallel relation upon and extending throughout substantially the entire length of the deck, and C are relatively short carriages that are within the main rails B at longitudinally spaced points thereof and are individually adjustable lengthwise of the rails.

Preferably the area of the deck A is such that it is capable of supporting thereon in tandem several vehicles of various sizes, i.e. vehicles having different lengths and/or widths. In the present instance we have shown in FIG. 3 an outline of two ground-engaging wheels D and a portion of the frame E of one of the vehicles mentioned.

The parallel main supporting rails B are rigidly secured to and serve effectively as reinforcements for the supporting deck A to prevent such deck from bending or buckling under the load of the vehicles in tandem thereon. Such main supporting rails B also serve as guides for the vehicles while they are being loaded onto or unloaded from the supporting deck A.

The adjustable carriages C are slidable lengthwise of and are supported by the main supporting rails B. Preferably four adjustable carriages are provided for each vehicle and are arranged in transversely aligned pairs at longitudinally spaced points of the main supporting rails B.

Each adjustable carriage C includes a body or casting 10, a pair of lock pins 12 and 14, and a detent pin 16. The lock pins 12 and 14 are disposed in laterally spaced parallel relation and extend transversely of the carriage at right angles to the direction of length of the rail B. The carriage has elongated transversely extending open-ended passages or tunnels 18 and 20 in which the pins 12 and 14 are slidably received. The passage 18 terminates at its ends in the laterally outwardly extending tubular bosses 22 and 24, and the passage 20 terminates at its ends in the laterally outwardly extending tubular bosses 26 and 28. These tubular bosses are of reduced internal cross section where indicated at 30, 32, 34 and 36 (FIG. 4) to guide the axial sliding movement of pins 12 and 14 within passages 18 and 20.

Compression coil springs 38 and 40 in passages 18 and 20 surround the pins 12 and 14 and urge them outwardly to their extended positions. Referring to FIG. 4, the pin 12 is shown in its extended position and the pin 14 is shown in its retracted position. The lock pins 12 and 14 also have handles 42 and 44 which are in the form of pins extending transversely outwardly from the lock pins and having their inner ends secured in any suitable manner to the lock pins. The handles 42 and 44 serve as means for manually retracting the lock pins. These handles project through elongated horizontal transverse slots 46 and 48 in the walls of the passages 18 and 20.

The compression coil springs 38 and 40 bear at their outer ends against the handles 42 and 44 and at their inner ends against the internal abutments 50 and 52. The extended positions of the lock pins 10 and 12 are determined by the engagement of the handles 42, 44 with the outer ends of the slots 46, 48 (see pin 12 in FIG. 4). The retracted positions of the lock pins are determined by the operation of the detent pin 16 as more fully described hereinafter (see pin 14 in FIG. 4).

The detent pin 16 is slidable in the four aligned openings 54, 56, 58 and 60 in the bosses 22 and 26. The detent pin has a tab or lever 62 secured to and projecting transversely therefrom for axially shifting the same. The pin 16 is shown in FIG. 4 in of its limiting positions in which it is engaged in openings 56, 58 and 60, this position being determined by the engagement of the lever 62 with the boss 26. It will be apparent that the detent pin 16 may be shifted axially to its opposite limiting position determined by the engagement of lever 62 with boss 22, at which time the detent pin 16 engages openings 54, 56 and 58. Thus it will be understood that the detent pin 16 is at all times in engagement with at least three of the openings 54, 56, 58 and 60.

The lock pins 12 and 14 are formed with transverse notches or recesses 64 and 66 in their undersurfaces as show in FIG. 2. In the retracted position of either lock pin, its notch is in alignment or registration with the detent pin 16 so that the detent pin may be shifted to either one of its limiting positions, entering the notch of the particular lock pin and thereby holding it retracted. In the retracted position of both lock pins, the detent pin 16 may be shifted to an intermediate position (see FIG. 1) in which the detent pin engages in both notches 64, 66 to hold both lock pins in retracted position. The lock pins are held from rotating by handles 42 and 44 so that the notches 64 and 66 will be in proper registration with the detent pin when the lock pins are retracted.

When a lock pin is extended, as lock pin 12 is shown to be in FIG. 4, its inner end portion presents a side abutment surface to the adjacent end of the detent pin 16 preventing the detent pin from moving toward the extended lock pin. Hence the detent pin cannot interfere with the retraction of the extended lock pin. The same is of course true with respect to the other lock pin 14. It will also be noted that the detent pin 16 cannot possibly release both lock pins simultaneously.

The carriage 10 has a pair of central upstanding ears 70 and 72, and a bolt 74 extends between the ears. A flexible element here shown as a link chain 76 has an end link encircling the bolt 74 between ears 70 and 72, and at the opposite end of the link chain there is a hook 80 adapted to engage in a suitable opening in the frame E of the vehicle.

Each carriage also has the tower sections 82 and 84 at the opposite ends which project slightly above the tunnel or passage forming portions of the carriage. These tower sections have openings 86 and 88 in the top sections thereof as seen in FIGS. 1 and 5, and also have openings 90 and 92 in the lower sections. The openings 86 and 88 provide abutment surfaces 94 and 96 so that the end of a tool can be inserted into either opening and engage the associated abutment surface to apply a pulling force on the carriage. Such tool is indicated at T. Another tool T' may be employed to exert a pushing force on the tower section, being formed to extend into the lower opening 90 or 92 of the tower section. The tools T and T' may actually be opposite ends of a single integral instrument, if desired, or a single end of a reversing tool. The body construction of the carriage in the region of the tower sections is such that the tool T or T' cannot contact the lock pins 12, 14 or their springs.

Referring again to the rails B, it will be noted that each parallel upstanding side walls 98 and 100 and that the side wall 98 has a series of equally spaced holes 102 formed along the length thereof. The spacing between the holes 102 is different than the spacing between the lock pins 12 and 14. The lock pins, which are of a diameter adapted to enter the holes 102, may for example be spaced apart 4½ inches and the holes 102 may for example be spaced apart 3 inches. Thus the increments of adjustment of the carriages along the length of the rails B may be reduced to 1½ inches.

With reference to FIG. 2, the upstanding sidewalls 98 and 100 of the rails B terminate in horizontal inturned flanges 104 which overlie the bosses 22—28 of the carriages to prevent the carriages from lifting out of the rails.

In use, the two lock pins 12 and 14 will be retracted and locked in their retracted positions by the detent pin 16 in the manner illustrated in FIG. 1. The vehicles to be transported may be moved onto the deck A of the transport from one end thereof to be supported in tandem thereon. The operator may then longitudinally position the associated carriage lengthwise in the supporting rail B and engage the hook 80 with an opening in the vehicle frame E. The operator will then engage the carriage with one of the tools T, T', and with an appropriate push or pull motion move the carriage longitudinally to the approximate final location desired. The final position is determined by the tightness of the flexible element 76 desired as well as the desired compression of the vehicle springs and the desired angle of the flexible element 76. The operator now will select which of the pins 12, 14 he desires to release for engagement with the selected opening 102 in the rail. Having made his selection, he will by manipulation of the lever 62 slide the detent pin 16 in one direction or the other from the FIG. 1 position to release the selected lock pin which will then snap outward from its retracted position causing its outer end to engage the apertured sidewall 98 of the rail B. Thereupon, the released lock pin snaps into the selected opening 102 as the tool pulls or pushes the carriage to final position. The tool may now be disconnected and moved to the next carriage. The tool for moving the carriage will preferably be operated by a hydraulic or mechanical jack or the like capable of applying a substantial amount of pushing or pulling pressure to adequately tension the tiedown chain.

In order to release the tiedown structure, the operator need merely hit the projecting end of the extended lock pin (12 in FIG. 4) with a mallet or hammer causing it to retract inwardly clear of the opening 102 in the rail, whereupon the tension in the tiedown chain will move the carriage and lock pin out of register with the opening 102.

At no time during the period when the vehicle is tied down may the unused lock pin move from its retracted position, being held in such position by the detent pin 16. As seen in FIG. 4, the detent pin 16 is prevented from moving toward the right by engagement of its lever 62 with boss 26 and is prevented from moving toward the left by the engagement of its end with the inner end portion of the extended lock pin 12. Thus the retracted lock pin 14 cannot be released and therefore cannot bear against the sidewall 98 of the rail B and impose a twist upon the carriage which inevitably would result in wear on the carriage and on the extended lock pin. The extended lock pin 12 can under no circumstances be blocked from retracting when it is desired to release the carriage, because the extended lock pin itself provides an abutment surface preventing the detent pin 16 from moving across its inner end.

We claim:

1. A carriage for a vehicle tiedown structure which comprises a longitudinally extending rail adapted to be anchored lengthwise upon a longitudinally extending deck of a transport and having an upright sidewall provided with a plurality of longitudinally spaced openings, said carriage being adapted to be carried by and movable lengthwise of said rail, a transverse lock pin axially slidably mounted on said carriage for movement between an extended position adapted to project through a selected opening in said upright sidewall and a retracted position withdrawn from said opening, spring means urging said lock pin toward its extended position, said lock pin when extended being free to be moved to its retracted position against the action of said spring means, releasable detent means for holding said lock pin in its retracted position, and a flexible element connected to said carriage and adapted to engage and hold a vehicle, said detent means including a detent pin axially slidably mounted on said carriage for movement transversely of said lock pin, said lock pin having an abutment portion in registration with said detent pin in the retracted position of said lock pin, said detent pin being axially movable to an operative position engaging said abutment portion in the retracted position of said lock pin to hold the same retracted, and said lock pin having a portion in registration with said detent pin in the extended position of said lock pin which blocks movement of said detent pin to its operative position.

2. A carriage for a vehicle tiedown structure which comprises a longitudinally extending rail adapted to be anchored lengthwise upon a longitudinally extending deck of a transport and having an upright sidewall provided with a plurality of longitudinally spaced openings, said carriage being adapted to be carried by and movable lengthwise of said rail, a pair of laterally spaced, transverse elongated lock pins each axially slidably mounted on said carriage for independent movement between an extended position adapted to project through a selected opening in said upright sidewall and a retracted position withdrawn from said opening, spring means urging said lock pins toward their extended positions, releasable detent means for holding said lock pins in their retracted positions, and a flexible element connected to said carriage and adapted to engage and hold a vehicle, said detent means including an elongated detent pin axially slidably mounted on said carriage for movement transversely of said lock pins, each lock pin having a recess which, in the retracted position thereof, is in registration with said detent pin, said detent pin being axially movable to a first position engaging the recess in one retracted lock pin to hold the same retracted, to a second position engaging the recess in the other retracted lock pin to hold the same retracted, and to a third position engaging the recesses in both retracted lock pins to hold both lock pins retracted simultaneously.

3. The carriage defined in claim 2, wherein means are provided for preventing rotation of said lock pins.

4. The carriage defined in claim 2, wherein said third position is between said first and second positions, and means are provided for preventing said detent pin from moving beyond said first and second positions, whereby said detent pin is operative to hold at least one of said lock pins retracted at all times.

5. The carriage defined in claim 4, wherein each pin has a solid portion which, in the extended position thereof, is in registration with said detent pin to block movement of said detent pin toward said extended lock pin.

6. The carriage defined in claim 5, wherein said carriage has abutment means adapted to be engaged by a tool for moving said carriage lengthwise of said rail.

7. A vehicle tiedown structure, comprising a longitudinally extending rail adapted to be anchored lengthwise upon a longitudinally extending deck of a transport and having an upright sidewall provided with a plurality of longitudinally spaced openings, a carriage carried by and moveable lengthwise of said rail, said carriage having a pair of laterally spaced, transverse tubular guide passages each being open at their outer ends, a pair of transverse elongated lock pins axially slidably mounted in said respective passages for independent movement between an outer extended position projecting beyond the outer ends of said passages through a selected opening in said upright sidewall and an inner retracted position withdrawn from said opening, the distance between said lock pins being different than the spacing between said openings, springs in said passages urging said lock pins outwardly toward their extended positions, releasable detent means for holding said lock pins in their retracted positions, said detent means including an elongated detent pin axially slidably mounted on said carriage for movement transversely of said lock pins, each lock pin having a recess which, in the retracted position thereof, is in registration with said detent pin, said detent pin being axially movable to a first position engaging the recess in one retracted lock pin to hold the same retracted, to a second position engaging the recess in the other retracted lock pin to hold the same retracted, and to a third position engaging the recesses in both retracted lock pins to hold the same retracted, each lock pin having a solid portion which, in the extended position thereof, is in registration with said detent pin to block movement of said detent pin toward said extended lock pin, a transverse handle pin projecting from each lock pin through an elongated slot in said carriage for use in independently retracting each lock pin, said handle pins and slots cooperating to prevent rotation of said lock pins, abutment means at both ends of said carriage adapted to be engaged by a tool for moving said carriage lengthwise of said rail, and a flexible element connected to said carriage and adapted to engage and hold a vehicle.

8. A carriage for a vehicle tiedown structure which comprises a longitudinally extending rail adapted to be anchored lengthwise upon a longitudinally extending deck of a transport and having an upright sidewall provided with a plurality of longitudinally spaced openings, said carriage being adapted to be carried by and movable lengthwise of said rail, a pair of laterally spaced, transverse elongated lock pins each axially slidably mounted on said carriage for independent movement between an extended position adapted to project through a selected opening in said upright sidewall and a retracted position withdrawn from said opening, spring means urging said lock pins toward their extended positions, said lock pins having abutment portions, movable detent means on said carriage engageable with said abutment portions to hold said lock pins retracted, and a flexible element connected to said carriage and adapted to engage and hold a vehicle, said detent means being movable to a first position holding one of said lock pins retracted but not the other, to a second position holding said other lock pin retracted but not the one, and a third position holding both said lock pins retracted.

9. The carriage defined in claim 8, wherein said detent means within the entire range of its movement is effective to hold at least one of said lock pins retracted.